UNITED STATES PATENT OFFICE.

JACOB REESE, OF PHILADELPHIA, PENNSYLVANIA.

METHOD OF MAKING BASIC SLAG.

SPECIFICATION forming part of Letters Patent No. 714,330, dated November 25, 1902.

Application filed March 3, 1902. Serial No. 96,488. (No specimens.)

*To all whom it may concern:*

Be it known that I, JACOB REESE, a citizen of the United States, residing at Philadelphia, in the county of Philadelphia and State of Pennsylvania, have invented a certain new and useful Improvement in Methods of Producing Basic Slag, of which the following is a full, clear, and exact description.

Phosphorus is one of the essentials of plant food. It exists in all calcareous phosphates in a tribasic state, ($3CaO.P_2O_5$,) but is not available in that state as plant food. The most successful method of making this tribasic compound available is to dissolve it in a mixture of equal parts of sulfuric acid, which tends to reduce the tribasic to a monobasic state; but in doing this a large quantity of sulfur is used and left in the resulting mass, which gives it a bad odor and is said to be injurious to the plants.

In the manufacture of steel by the Reese basic dephosphorizing process the phosphorus contained in the iron is oxidized to phosphoric acid and taken up by the lime and withdrawn as a calcareous basic slag, an average sample of which when analyzed shows the following composition in percentage, namely: silica, 11.60; lime, 53.38; oxid of iron, 10.80; oxid of manganese, 4.26; phosphoric acid, 19.96; total, one hundred. This slag is found to be a tetrabasic compound of the following composition: $P_2O_5 4CaO$, and is available as plant-food without treatment with sulfuric acid. This tetrabasic slag is so acceptable to the farmers and when applied to the ground is so productive of large crops that it is consumed as fast as it is produced.

I have discovered that by admixing eighty-five per centum of tribasic mineral calcareous phosphate with about five per centum of oxid of manganese and about ten per centum of oxid of iron and subjecting the mixture to a high oxidizing-flame, preferably in a cupola-furnace, until fusion takes place the material will flow out of the furnace as a porous basic slag, an average specimen of which analyzed as follows in percentage, namely: silica, 10.13; lime, 50.03; oxid of iron, 10.04; oxid of manganese, 4.50; phosphoric acid, 25.30; total, one hundred. The materials may be placed successively in the furnace or mingled before or after being placed in the furnace.

The phosphate which is used may be that found native in Tennessee, South Carolina, and Florida, or it may be artificially produced.

Although I am not positive as to its being a tetrabasic compound, I am inclined to believe that the presence of manganese and the high temperature of fusion has changed the $3CaOP_2O_5$ to $P_2O_5 4CaO$.

In the practice of this invention I am enabled to produce a basic slag having any percentage of phosphoric acid varying from ten to thirty per centum by simply varying the proportions of ingredients in the mixture.

What I claim, and desire to secure by Letters Patent, is—

1. The method of producing basic slag, which consists in fusing mineral calcareous phosphate with oxid of manganese, and oxid of iron.

2. The method of producing basic slag, which consists in mixing mineral calcareous phosphate with oxid of manganese and oxid of iron, and fusing the mixture in presence of an oxidizing-flame until it flows.

3. The method of changing mineral calcareous phosphate from a tribasic ($P_2O_5 3CaO$) to a compound having a larger percentage of base, which consists in mixing the tribasic material with oxid of manganese and oxid of iron, and fusing the mixture.

In testimony whereof I have hereunto set my hand this 1st day of March, A. D. 1902.

JACOB REESE.

Witnesses:
ROBERT W. DAVIS,
CHARLES W. SPARHAWK,
ROBERT M. MCILWAIN.